(12) United States Patent
Cook

(10) Patent No.: US 9,445,555 B2
(45) Date of Patent: Sep. 20, 2016

(54) IRRIGATION WHEEL SYSTEM

(71) Applicant: Ivan Cook, Hermiston, OR (US)

(72) Inventor: Ivan Cook, Hermiston, OR (US)

( * ) Notice: Subject to any disclaimer, the term of this patent is extended or adjusted under 35 U.S.C. 154(b) by 0 days.

(21) Appl. No.: 14/453,262

(22) Filed: Aug. 6, 2014

(65) Prior Publication Data

US 2016/0037703 A1 Feb. 11, 2016

(51) Int. Cl.
*A01G 25/09* (2006.01)

(52) U.S. Cl.
CPC .............. *A01G 25/092* (2013.01); *A01G 25/09* (2013.01)

(58) Field of Classification Search
CPC ..... A01G 25/02; A01G 25/09; A01G 25/092
USPC ................. 239/735; 301/64.307, 65, 66, 104
See application file for complete search history.

(56) References Cited

U.S. PATENT DOCUMENTS

| | | | | |
|---|---|---|---|---|
| 2,249,138 A | * | 7/1941 | Hill | B60C 27/045 |
| | | | | 301/47 |
| 8,657,215 B1 | * | 2/2014 | Blum | B60B 1/10 |
| | | | | 239/726 |
| 8,672,064 B2 | * | 3/2014 | Korus | B62D 55/04 |
| | | | | 180/9.26 |
| 9,051,009 B2 | * | 6/2015 | Prohaska | B62D 11/22 |
| 2011/0121090 A1 | * | 5/2011 | Price | A01G 25/092 |
| | | | | 239/1 |
| 2015/0202926 A1 | * | 7/2015 | Fredenburg | B60C 11/0311 |
| | | | | 152/209.12 |

* cited by examiner

*Primary Examiner* — John G Weiss
(74) *Attorney, Agent, or Firm* — Wells St. John, P.S.

(57) ABSTRACT

This invention includes embodiments which disclose a wheel system for use in supporting irrigation equipment such as irrigation circles and pivots, among others. Embodiments of the disclosed wheel system may include a plurality of feet with gaps there-between, configured generally radially around a hub and to minimize the lateral displacement of mud, soil water.

7 Claims, 15 Drawing Sheets

IRRIGATION WHEEL SYSTEM

CROSS REFERENCE TO RELATED APPLICATION

This application does not claim priority from any other application.

TECHNICAL FIELD

This invention generally relates to an irrigation wheel system, more particularly to a wheel system for use on movable irrigation systems, typically those that move in a circle or linearly across a field.

BACKGROUND OF THE INVENTION

Irrigation circles or wheels have for many years been changing the face of irrigation and greatly enhance the ability to minimize the labor required to monitor and move irrigation pipe. While much of the description regarding this invention may be directed to an embodiment for what are known as irrigation circles, this invention is not so limited, but instead had embodiments which may be applied for other irrigation systems, and outside of irrigation.

A typical irrigation circle includes several tower frameworks supported by one or more wheels and/or tires which pitted or circle around a central axis. Some pivot 180° and reverse, while others have it in a 360° circle.

It has been known for many years that one problem which has yet to be solved is that because the tires which support the irrigation towers operate within such a wet environment, they tend to sink into the mud created by the irrigation, create tracks, create dirt mounds and numerous other problems which impede the ability to harvest or remove the crop from the field. Despite this long-felt need in recognition of the problem, no solutions as effective as the one presented by embodiments of the present invention have been developed. These ruts or deep tracks may develop into the soil one or two feet deep resulting in significant issues keeping the irrigation moving through the field and/or causing excess wear or stress on the equipment.

A significant recognition of the need and of the rut problem has resulted in many different attempts to come up with a solution, all of which go in directions different than this invention—i.e. they teach away from this wheel system. Some prior systems have attempted to utilize more tires, which results in more but smaller rocks and more field area lost to the additional rocks. Others have attempted to devise different traction devices, such as different tread patterns and protrusions on the tires and wheels to help prevent them from getting stuck in the mud, or to provide them additional traction or leverage to help remove them from the mud rut once they are stuck. Generally these prior attempts have been either more expensive and/or less effective than desired.

It is therefore an object of embodiments of this invention to provide a wheel system for irrigation systems such as circles which greatly reduces or eliminates some or all of the problems associated with traditional prior art tires creating significant ruts and buildup of dirt around the ruts, under irrigation piping, and in some more particular embodiments, under irrigation circles.

It will be appreciated by those of ordinary skill in the art that while the specification is primarily directed to an embodiment of the invention for irrigation circles, this invention is not so limited and may be applied or used on other irrigation systems and configurations.

While the invention was motivated in addressing some objectives, it is in no way so limited. The invention is only limited by the accompanying claims as literally worded, without interpretative or other limiting reference to the specification, and in accordance with the doctrine of equivalents. Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
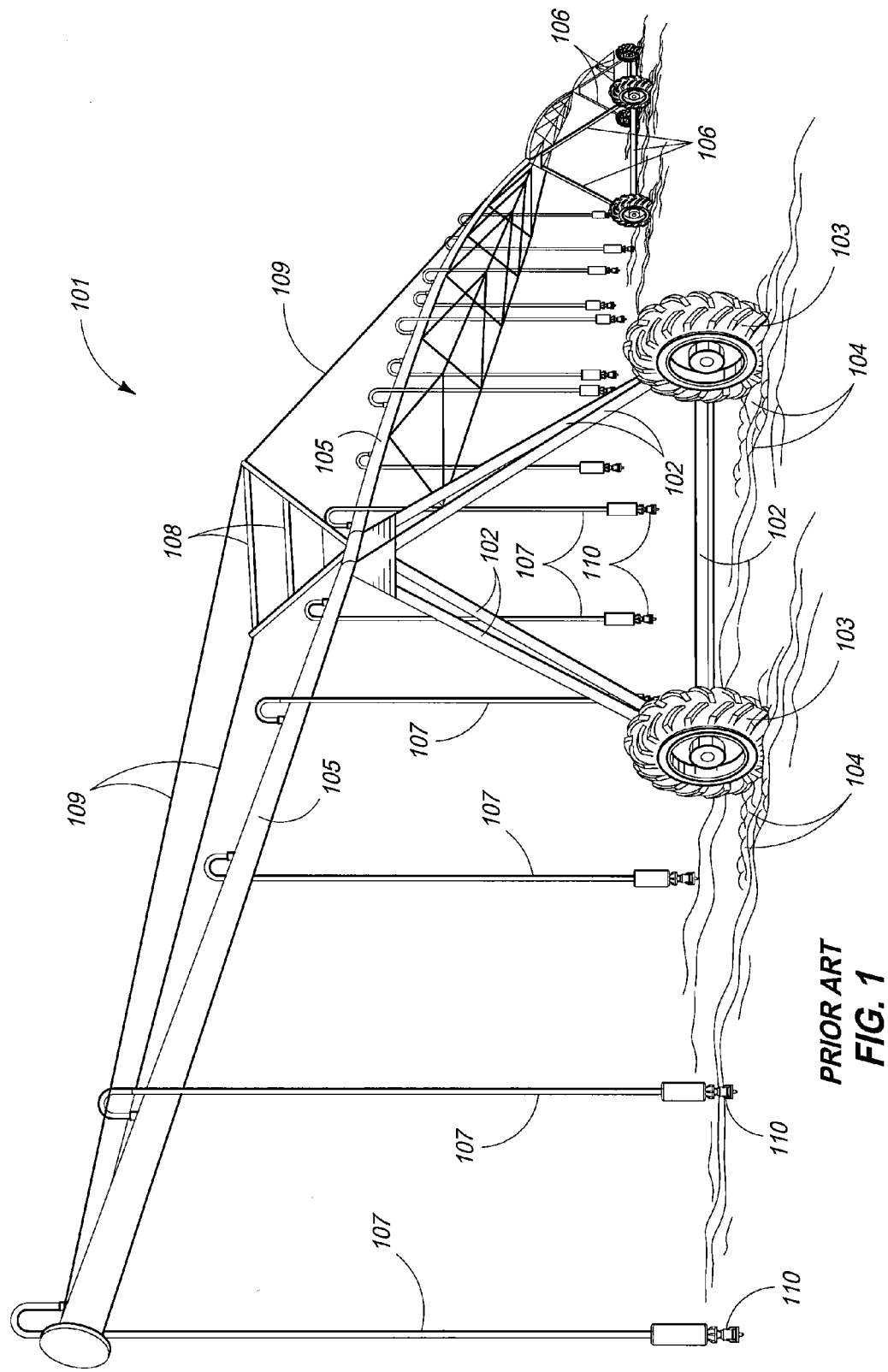
FIG. 1 is an elevation perspective view of one example of an irrigation circle or pivot in the prior art.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an" and "the" as used in the claims herein are used in conformance with long-standing claim drafting practice and not in a limiting way. Unless specifically set forth herein, the terms "a", "an" and "the" are not limited to one of such elements, but instead mean "at least one".

It will be appreciated and is known by those of ordinary skill in the art that the weight from the irrigation circle and water or other liquid circulated there-through, asserted downwardly on the typical prior art tire, causes great force downward on the wet soil or track (oftentimes a mud puddle or deep mud). As the downward force is imposed by the tire in the track, the mud, soil and water then present is displaced laterally to the side. As illustrated partly in FIG. 2, this creates buildup adjacent the tracks and tires in the form of piles of dirt and mud and other debris. Sometimes the ruts get to be as much as two feet deep and cause the irrigation equipment to stop moving. Thus the combination of the additional build-up with the additional watering as the irrigation circles continue to operate, creates especially deep ruts and often times results in the tires getting stuck and the irrigation equipment (an irrigation circle for example) stops moving. For irrigation system which is designed for remote or personnel free operation, getting a wheel stuck with a system shutdown or watering the same plants too long is a very undesirable result.

It will also be appreciated by those of ordinary skill in the art and those users of traditional irrigation circle systems, that additional difficulties are present when circles are operated on land which has a grade or slope to it. The problem moving the weight of a typical irrigation system and/or irrigation towers over a track with a slope to it worsens the situation and makes it easier for the equipment to get stuck in the muddy rut. There has been a long felt but yet unsatisfied need for such a wheel system as embodiments of this invention present.

This invention includes embodiments which disclose a wheel system for use in supporting irrigation equipment such as irrigation circles and pivots, among others. Embodiments of the disclosed wheel system may include a plurality of feet configured generally radially around a hub and to minimize the lateral displacement of mud, soil and water.

In some aspects and embodiments, this invention may be considered to be a rotating rotary irrigation system mobile support apparatus (or wheel) that provides movement for the mobile irrigation equipment through the rotation of the rotary or wheel about its axis via its hub. Embodiments of this invention a vertical control or buoyancy mechanism and a mechanism and/or a means which minimizes or reduces the lateral displacement of water, mud and/or soil (by in some embodiments keeping it within the boundaries of the width of the feet). The use of this rotary irrigation support system by managing, minimizing and/or eliminating the lateral displacement of water, mud and/or soil, minimizes or eliminates ruts in the field being irrigated.

Embodiments of this invention also provide separately and/or concurrently, a traction system which reduces or eliminates the chances that the irrigation system will become immobile or stuck in the field being irrigated.

Embodiments of this invention may also be considered to be a dynamic mud management system which reduces or eliminates the lateral displacement of water, mud and/or soil under a mobile or dynamic irrigation system and thereby also reduces or eliminates the problems associated with ruts and/or soil buildup in the field being irrigated.

In the embodiments of this invention that are or include a wheel for use supporting irrigation equipment including irrigation circles, the wheel may include a framework projecting radially outward from a hub, the framework operationally attached at a radially inward end to the hub; a plurality of support platforms FIG. 1 is an elevation perspective view of one example of an irrigation circle or pivot in the prior art, illustrating irrigation circle 101, tower framework 102, tires 103 on dirt or soil 104, fluid conduit 105, fluid tubing 107 providing water to sprinkler or outlets 110. Overhead tower frame structure 105 and support wires 109 are also shown.

FIG. 1 also illustrates other irrigation circle support towers 106. It will be appreciated by those of ordinary skill in the art that embodiments of this invention apply to irrigation surface of all sizes, including those with one, two, three or numerous additional power structures.

Figure 2:
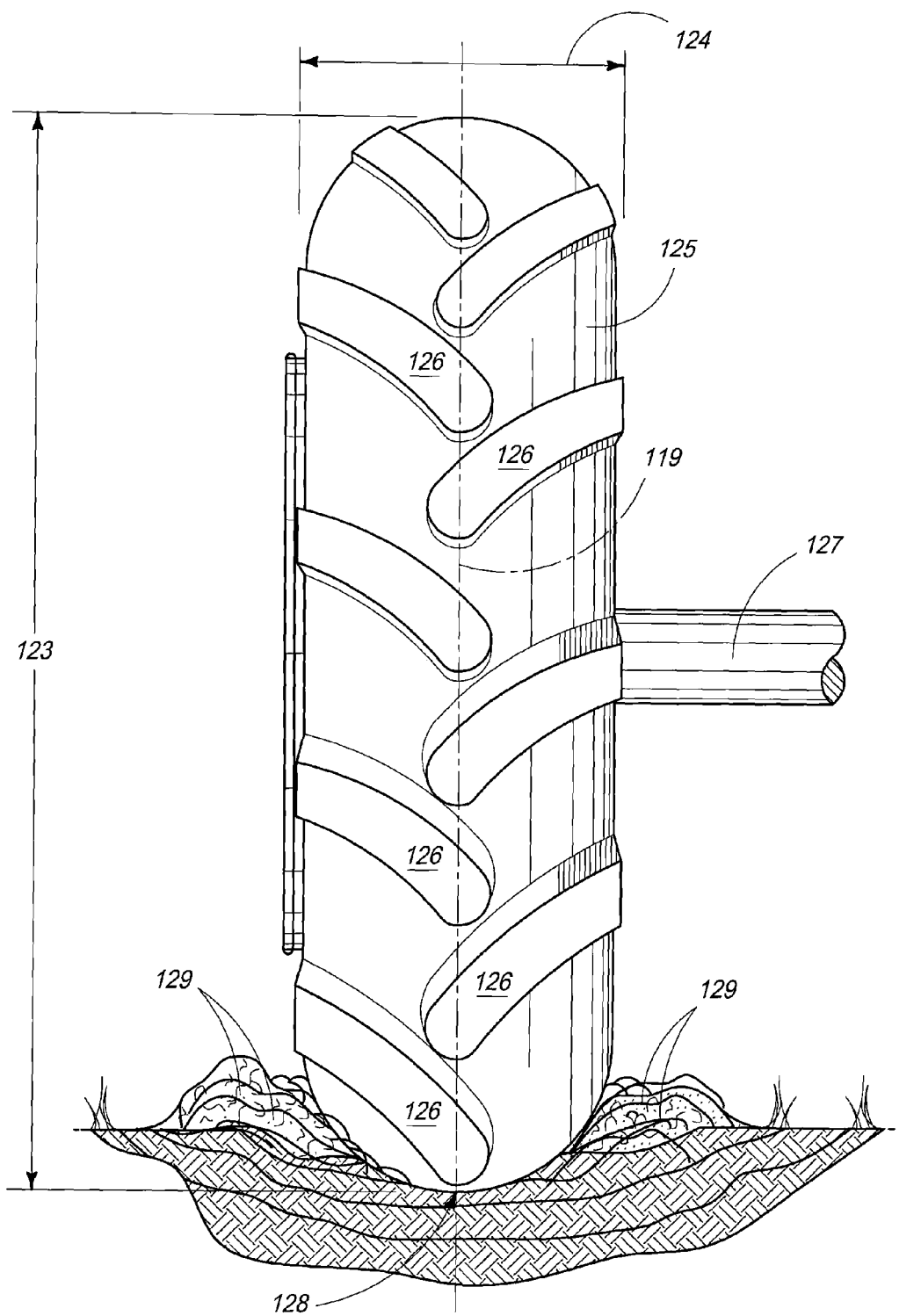
FIG. 2 is an elevation view of a typical tire utilized to support an irrigation circle tower, also illustrating a rut in which the tire sits.

FIG. 2 is an elevation view of a typical tire 125 utilized to support an irrigation circle tower, also illustrating a rut 128 in which the tire 125 sits. FIG. 2 illustrates a prior art irrigation circle tire 125, axle 127, vertical axis 119, tire tread 126 in rut 128 with lateral material 129 build up around rut 128. This typical prior art tire has a width 124, diameter 123 in any one of a number of different tread configurations.

One of ordinary skill and experience in the art can understand how the ruts 128 form and then how the mud, water and debris material buildup laterally as shown by item 129.

Figure 3:
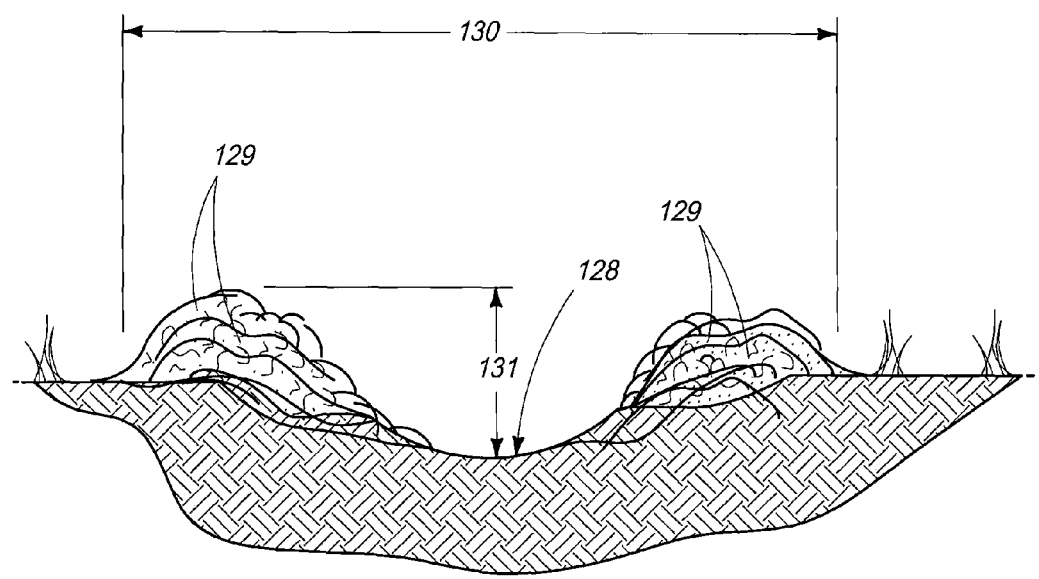
FIG. 3 is an elevation view one illustration or example of a rut created by irrigation circle tire with buildup lateral to the vertical axis of the tire.

FIG. 3 is an elevation view of one illustration or example of a rut 128 created by irrigation circle tire (not shown in FIG. 3) with material buildup 129 lateral to the vertical axis (such as illustrated in FIG. 2) of the tire. FIG. 3 also illustrates the depth 131 of the rut 128 combined with the material buildup 129, and the approximate width 130 the combination of the rut 128 and material buildup 129 on each side of the rut 128.

Figure 4:
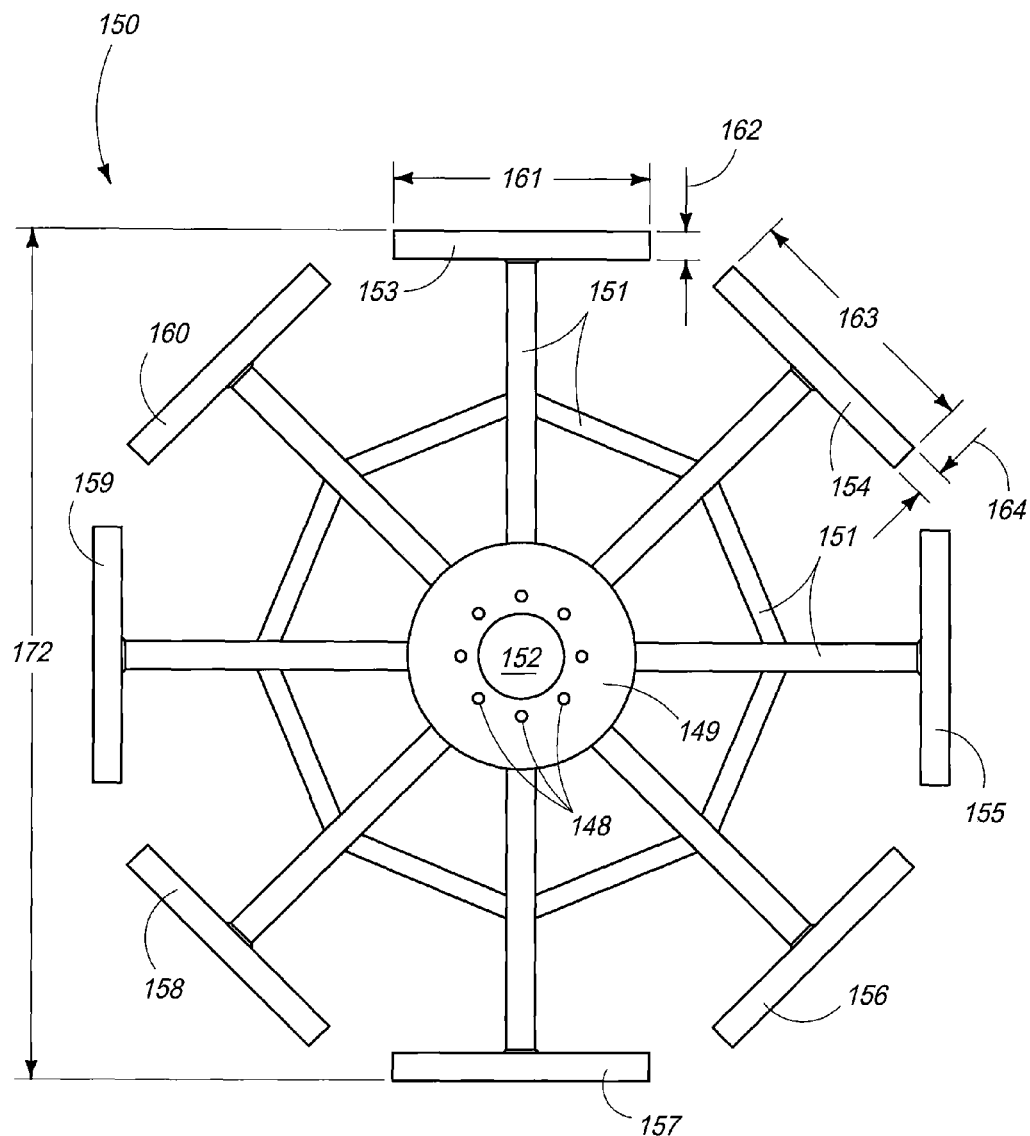
FIG. 4 is a front elevation view of one example of an embodiment of this invention.

FIG. 4 is a front elevation view of one example of an embodiment of a wheel system 150 contemplated by this invention, showing eight feet (153, 154, 155, 156, 157, 158, 159, and 160) in this example. Wheel framework 151 is also shown supporting the feet 153-160 around the axis 152. Bolt Apertures 148 are shown in hub 149 and utilized to attach the wheel system 150 to an irrigation circle drive. The wheel system 150 illustrated in FIG. 4 shows wheel diameter 172. It will be appreciated by those of ordinary skill in the art that a framework may be provided to locate the feet 153-160 relative to the axis 152, in that no one particular framework configuration or structure is required to practice this invention. It will also be appreciated that diameter 172 may be any one of a number of different diameters which may be chosen based upon the size chosen for the design of the feet 153-160, the topography of the field(s), or based on other design considerations, all within the contemplation of this invention.

In the embodiment illustrated in FIG. 4, the feet are shown all approximately the same size, with the length 161 and depth or thickness 162 being shown for foot 153. Foot 154 shows a length 163 and a depth 164, which may be the same or different than that for foot 153 or any of the other feet, all within the contemplation of this invention.

Other surface areas and other dimensional aspects that may be utilized in embodiments of this invention are shown in later figures, such as FIG. 7, FIG. 8, and FIG. 13, which are described below.

Figure 5:
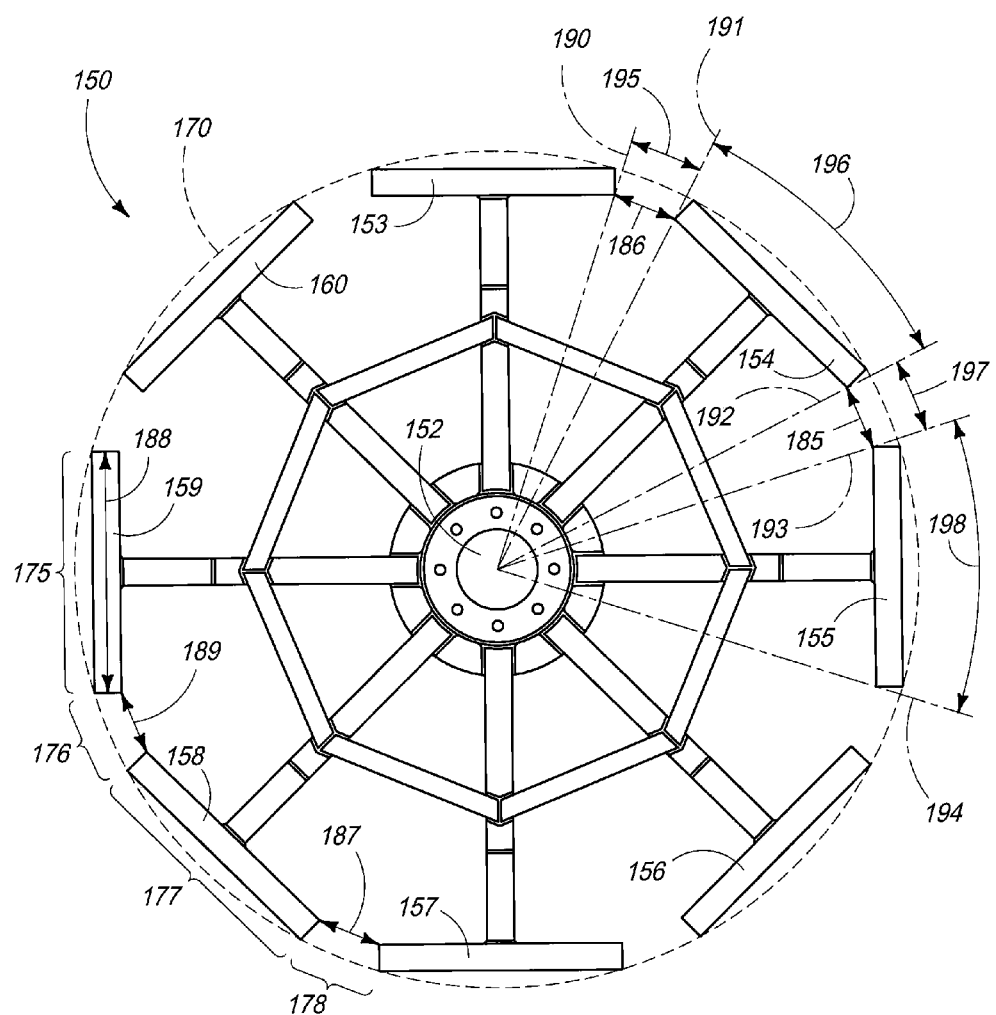
FIG. 5 is a rear elevation view of the example of the embodiment of this invention illustrated in FIG. 4.

FIG. 5 is a rear elevation view of the example of the wheel system embodiment of this wheel system invention illustrated in FIG. 4, and similarly labeled items are shown and common to FIG. 4 will not be re-described. FIG. 5 illustrates an approximate general circular circumference 170 around the feet 153-160 of the wheel system 150, which helps illustrate aspects of different embodiments of this invention. For example foot 159 has not only width 188, but that width 188 occupies a foot portion 175 of the circular circumference 170, while the gap between foot 158 and foot 159 occupies gap portion 176 of circumference 170 even though gap 189 has a predetermined width. Foot 158 occupies foot portion 177 of circumference 170 and gap 187 occupies gap portion 178 of circumference 170 corresponding to gap 187.

The upper portion of the wheel system 150 illustrated in FIG. 5 illustrates the angular relationship of the gap portions to the foot portions of the example, 186 occupies angular portion 195 and foot 154 occupies angular portion 196, gap 185 occupies angular portion 197 of circumference 170, and so. It will be appreciated by those of ordinary skill in the art that for given applications of embodiments of this invention, there will be relationships and correlations for optimizing the design and performance of the wheel system 150 to minimize the running and material buildup that has become such a problem with prior art irrigation circle wheels.

It will also be appreciated by those of ordinary skill in the art that while this and other embodiments may illustrate a wheel preferred with a plurality of 8 feet, this invention is not so limited and applications of it may include five or more individual feet, or as few as two feet (which would preferably include an arcuate external surface for operational purposes), all within the contemplation of this invention.

Figure 6:
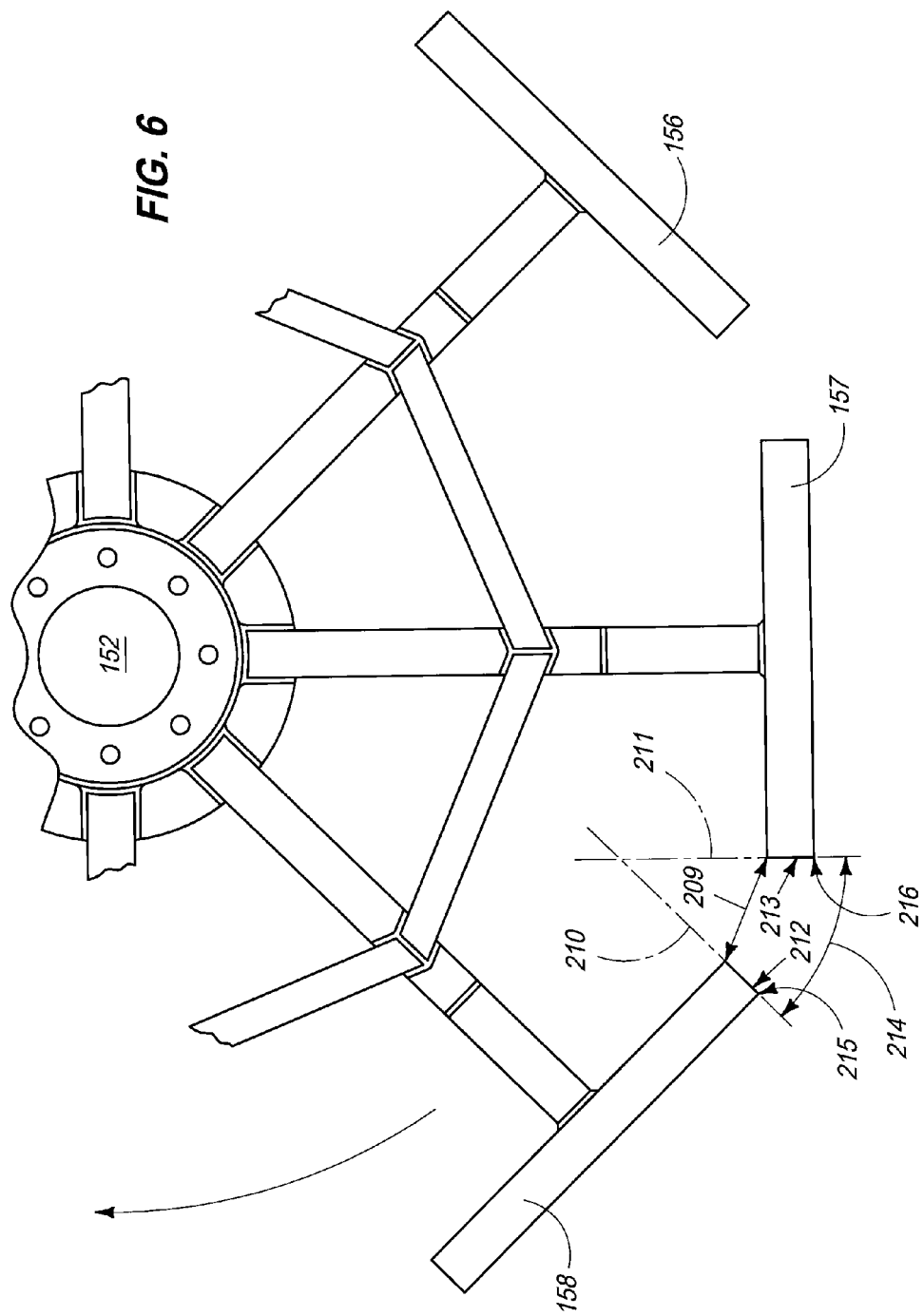
FIG. 6 is a partial detail elevation view of the example of the embodiment of this invention illustrated in FIG. 5.

FIG. 6 is a partial detail elevation view of the example wheel system and of the embodiment of this invention illustrated in FIG. 5, illustrating axis 152, feet 156, 157 and 158, as well as exemplary framework to support feet. It will be noted that the rectangular cross-section of the feet 156, 157 and 158 configured roughly around the circumference, provide a leading and trailing edge for each of the feet. If additional traction is required, the angle of the leading or trailing edges of the feet may be altered or additional members, edges another or other traction devices may be added to those edges. For illustration purposes, the wheel system FIG. 6 may rotate clockwise (to identify the leading and trailing ends and edges). However, it will be appreciated that embodiments of the invention may be rotated or utilized either way.

FIG. 6 illustrates foot 158 with trailing end 212, trailing edge 215, and foot 157 with leading end 213, leading edge 216. The angle 214 between trailing end 212 and leading end 213 is illustrated by extended lines 210 and 211. It will be appreciated by those of ordinary skill in the art that angle 214 relative to leading edge 216 and trailing edge 215 may be adjusted for the desired effect. To accomplish different features and aspects in different applications of embodiments of this invention, the length of gap 209 may also be adjusted.

Figure 7:
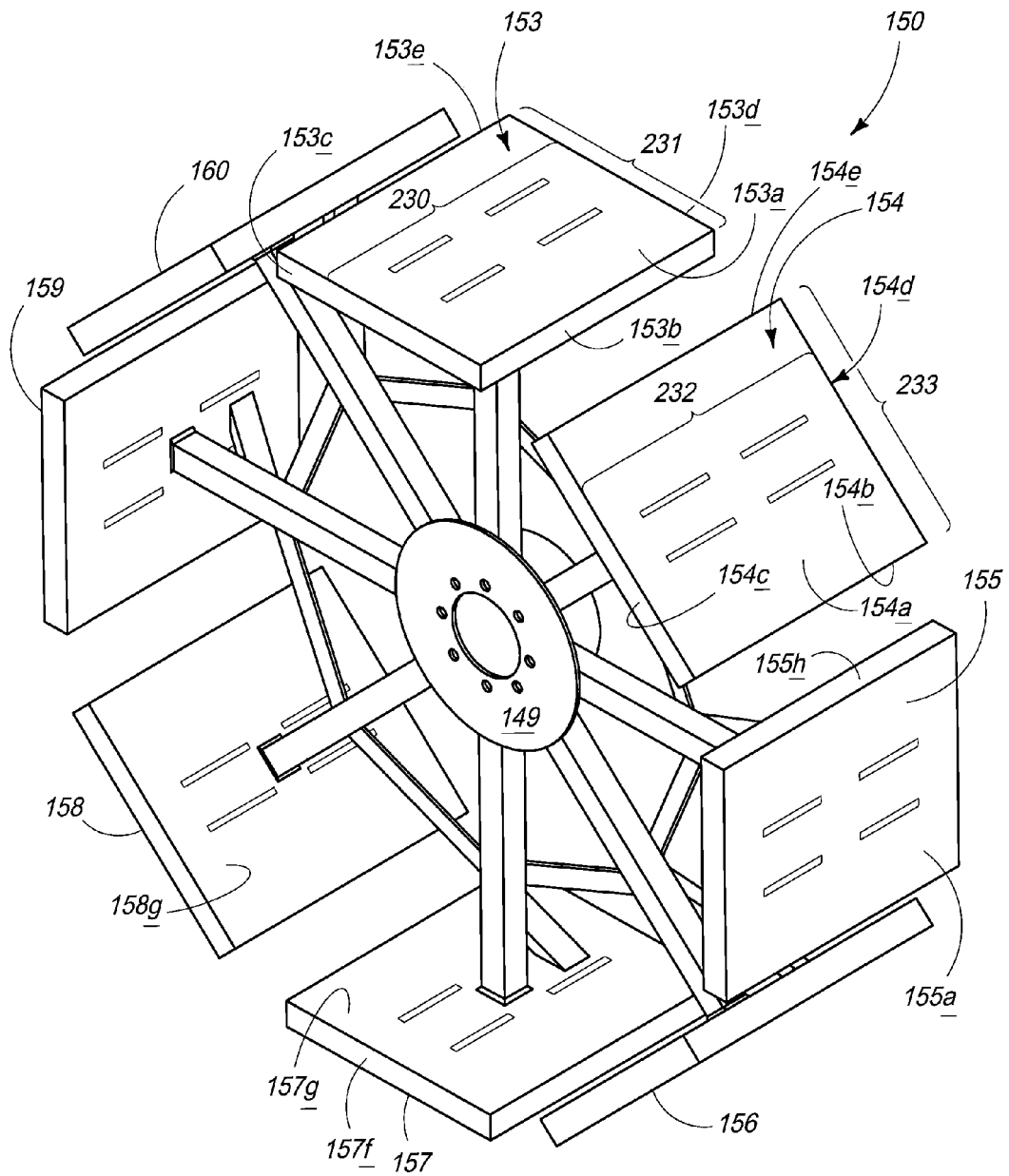
FIG. 7 is a front perspective view of the example of the embodiment of this invention illustrated in FIGS. 4-6.

FIG. 7 is a front perspective view of the example of the embodiment of this invention illustrated in FIGS. 4-6. FIGS. 7, 8, 12 and 13 illustrate differently sized surfaces and differently proportioned foot dimensions. Typical prior art wheels and combinations of wheels, wheel tread and other attempts directed to solve this long felt problem, have primarily focused on traction. However, while this invention achieves traction any way, it also focuses on buoyancy of the wheel. In FIG. 7, each of the feet have an outer surface of a predetermined length and width to achieve the desired buoyancy in a given application of an embodiment. For example foot 153 includes outer surface 153*a*, leading end 153*b*, leading edge 153*d*, trailing edge 153*e*, side 153*c*, width 230, length 231; and foot 154 whose outer surface 154*a*, leading end 154*b*, leading edge 154*d*, trailing edge 154*e*, side 154*c*, width 232, length 233. It will be appreciated by those of ordinary skill in the art that while surface areas of the outer surfaces are shown equal or approximately equal, it may be varied by varying the length and/or with the visual design objectives in various aspects of the embodiment of the invention being applied. Although not limited to any one particular size or range of sizes, feet contemplated by some illustrated embodiments of this invention may be in the range of eight (8) (or less) inches to thirty (30) inches or more wide and long, with the width 230 typically being preferably greater than its length 231.

FIG. 7 further illustrates an embodiment of the inner surfaces of some of the feet, including inner surface 158*g* for foot 158 and inner surface 157*g* for foot 157, as well as end 157*f* for foot 157.

Figure 8:
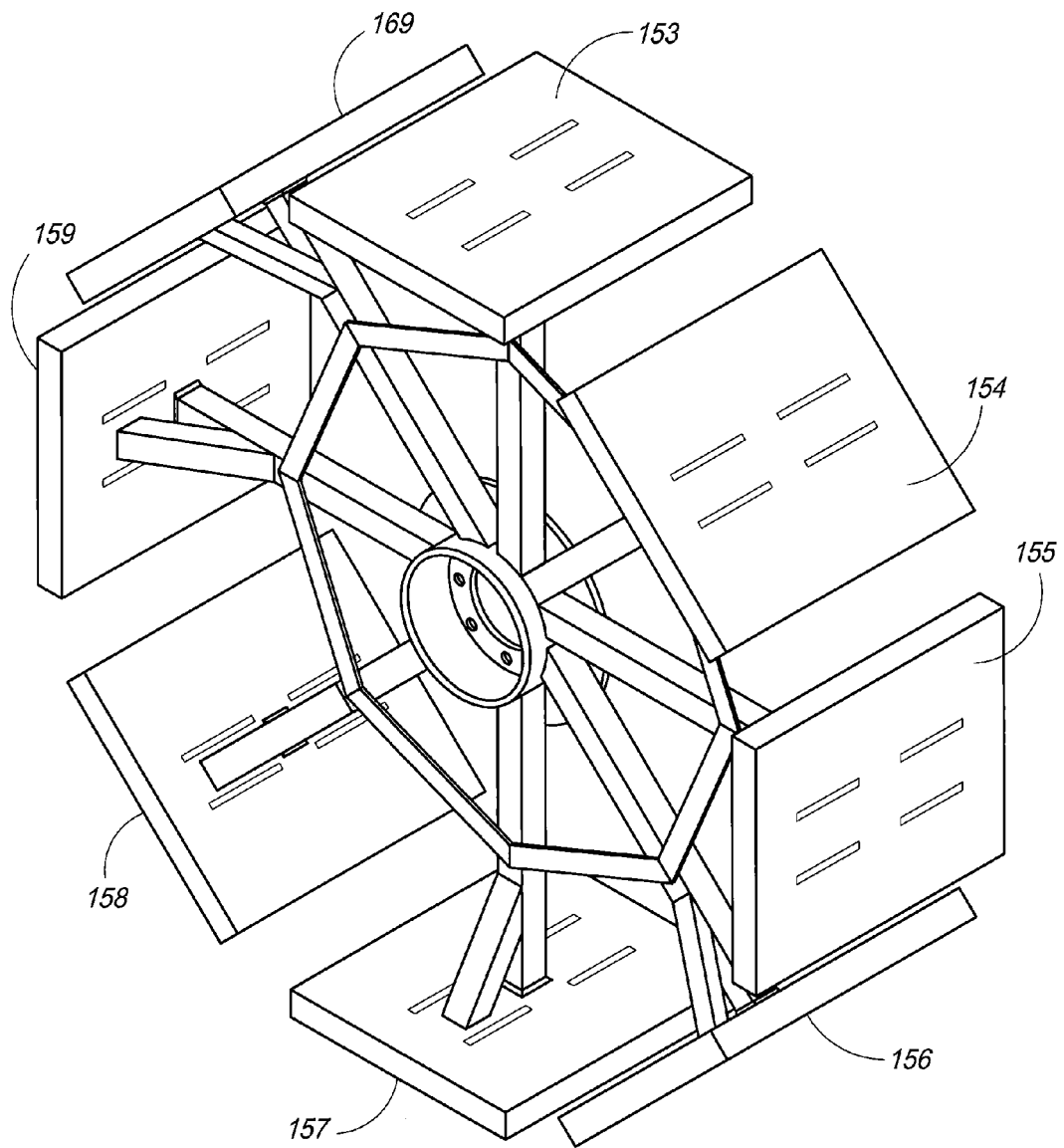
FIG. 8 is a rear perspective view of the example of the embodiment of this invention illustrated in FIGS. 4-7.

FIG. 8 is a rear perspective view of the example of the embodiment of this invention illustrated in FIGS. 4-7, and like numbered items are described above and will not be re-described here.

Figure 9:
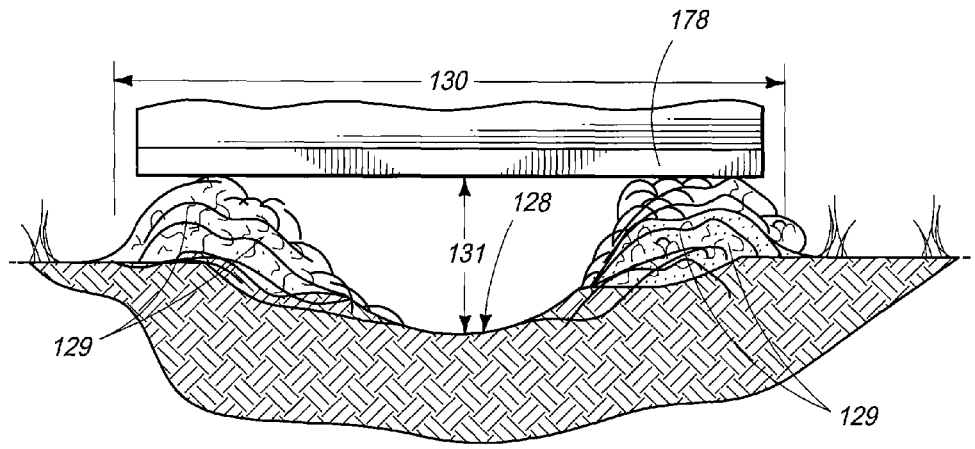
FIG. 9 is an elevation view of one illustration or example of a rut created by irrigation circle tire with buildup lateral to the axis of the tire, representing one example of how it initially may look when this invention may be placed over a traditional built up rut.

FIG. 9 is an elevation view of one illustration or example of a rut 128 created by irrigation circle tire with material buildup 129 lateral to the axis of the tire, representing one example of how it initially may look when this invention may be placed over a traditional built up rut 128. FIG. 9 illustrates the approximate height 131 of the combination of the rut 128 and the material buildup 129, along with an exemplary foot 178 on top of the material buildup 129.

Figure 10:
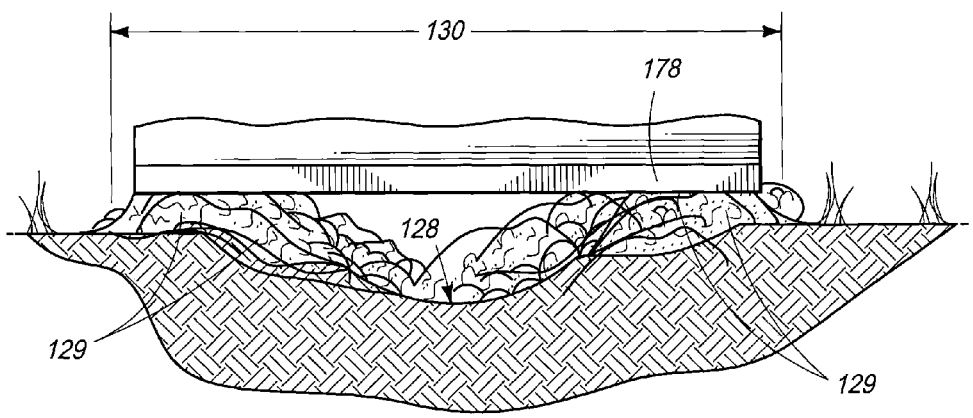
FIG. 10 is an elevation view of one illustration or example of a rut created by irrigation circle tire with buildup lateral to the vertical axis of the tire, representing one example of how it may appear after some limited use of an embodiment of this invention (which has partially flattened out the side buildup lateral to the rut)

FIG. 10 is an elevation view of one illustration or example of a rut 128 created by irrigation circle tire with buildup material 129 lateral to the vertical axis of the tire, representing one example of how it may appear after some limited use of an embodiment of this invention (which has partially flattened out the side buildup lateral to the rut 128), and like numbered items are described above and will not be re-described here.

Figure 11:
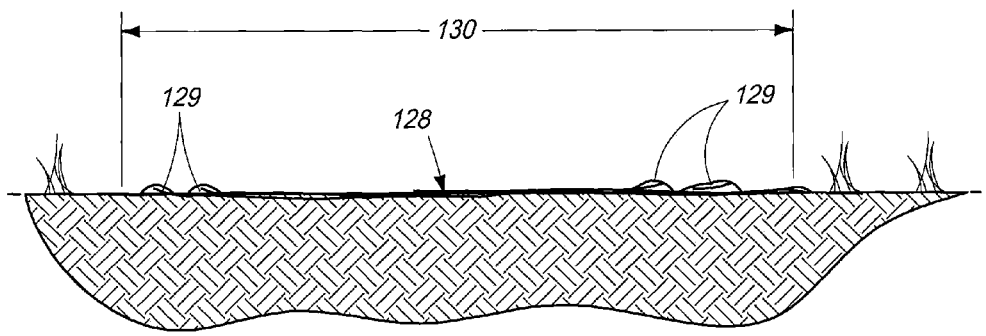
FIG. 11 is an elevation view of one illustration or example of how a rut created by a typical prior art irrigation circle tire (which would have included buildup lateral to the vertical axis of the tire), may be flattened out by an embodiment of this invention.

FIG. 11 is an elevation view of one illustration or example of how a rut 128 created by a typical prior art irrigation circle tire (which would have included buildup material lateral to the vertical axis of the tire), may be flattened out by an embodiment of this invention), and like numbered items are described above and will not be re-described here.

Figure 12:
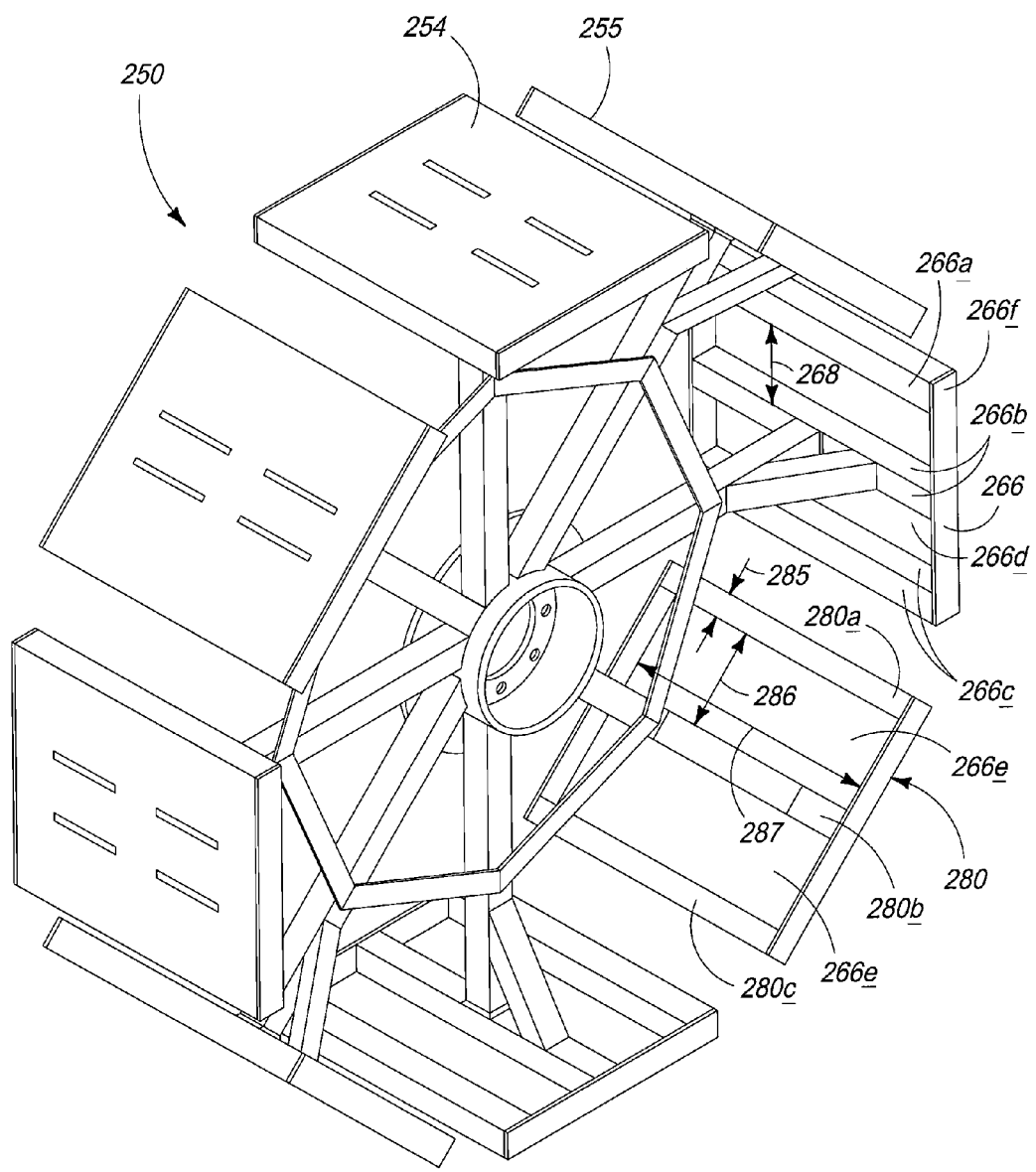
FIG. 12 is a rear perspective view of another example of an embodiment of this invention, wherein the inward surfaces of the feet of the wheel are not enclosed as they are in prior figures.
Figure 13:
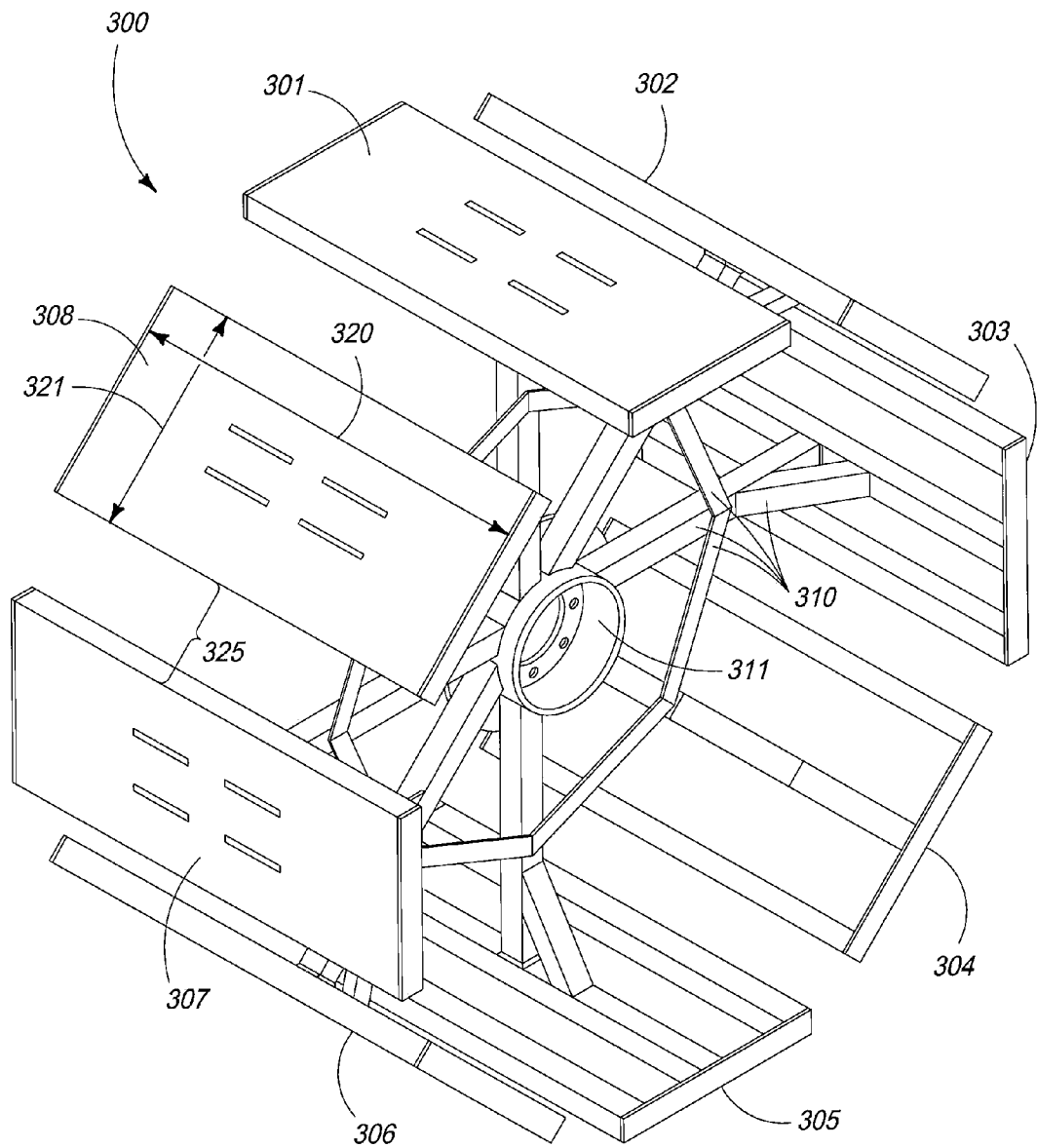
FIG. 13 is a rear perspective view of yet another example of an embodiment of this invention wherein the feet of the wheel are differently proportioned than the embodiment illustrated in FIG. 11 or 12.

FIG. 12 is a rear perspective view of another example of a wheel system 250 embodiment of this invention, wherein the inward or inner surfaces of the feet of the wheel are not enclosed as they are in prior figures FIG. 13 is a rear perspective view of yet another example of a wheel system 300 embodiment of this invention wherein the feet of the wheel are differently proportioned than the embodiment illustrated in FIG. 11 or 12. FIG. 13 illustrates an example feet 301, 302, 303, 304, 305, 306, 307, and 308, while an exemplary dimension for the outer surfaces of the feet in FIG. 12 may be eighteen inches by eighteen inches, an exemplary length and width of the feet illustrated in FIG. 13 may be thirty inches wide by sixteen inches long. Foot 308 in FIG. 13 illustrates width 320 and length 321 with gap distance 325 (may be for example from four inches to eight inches) between foot 307 and 308. FIG. 13 also illustrates hub 311 framework 310.

Figure 14:
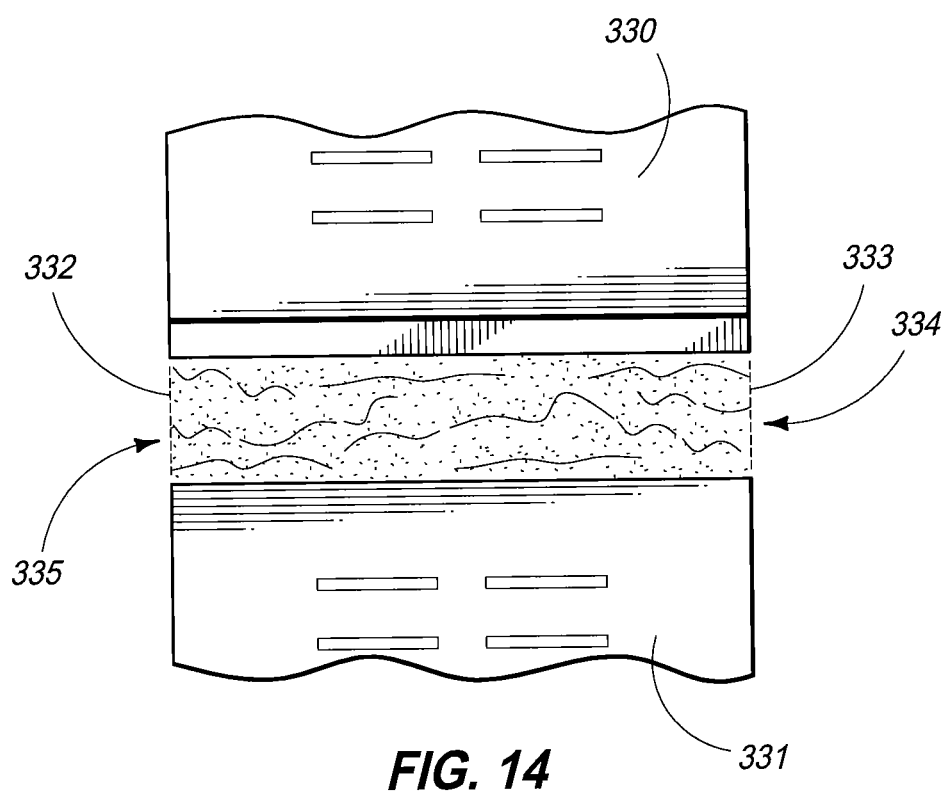
FIG. 14 is a detail view looking radially outward at the space between adjacent feet, illustrating that the mud and/or water in the path is substantially contained laterally, tending to squish within the width of the feet.

FIG. 14 is detail view looking radially outward at the space between adjacent feet, illustrating that the mud and/or water in the path is substantially contained laterally, tending to squish within the width of the feet.

In aspects or embodiments of this invention, the combination of buoyancy and traction may be viewed geometrically as a correlation between the proportion of the area (in radial or degree terms, in relative surface linear and/or area terms); between the gaps and the feet or platform. The tires on traditional prior art wheels generally have a continuous circumference perhaps with some tread thereon to attempt to deal with the lack of traction issues.

A minimum amount of surface area is required to achieve the buoyancy goals and to avoid creating ruts, while at the same time a sufficient gap between platforms or feet is desired to provide traction and to control the direction of displacement of the water, mud and/or soil. The sufficient gap may be provided with additional traction contribution from, as one example, a leading edge (or other edge) on the platforms, feet or shoes.

Figure 15:
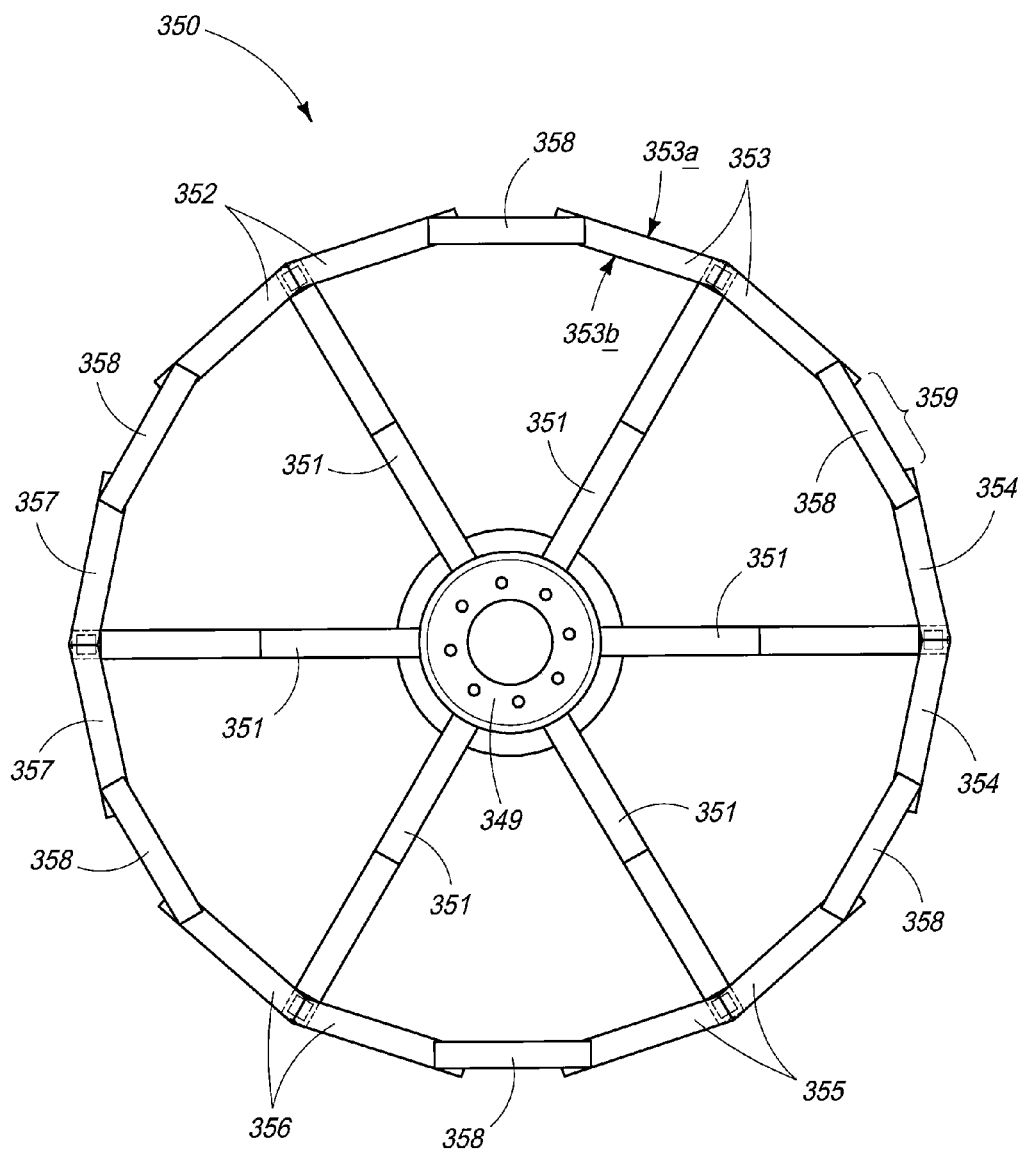
FIG. 15 is an elevation view of another example of an embodiment of this invention, illustrating a wheel system wherein the feet are interconnected generally around the periphery.

FIG. 15 is an elevation view of another example of an embodiment of this invention, illustrating a wheel system 350 wherein the feet are interconnected generally around the periphery. FIG. 15 illustrates a plurality of feet 352, 353, 354, 355, 356 & 357 around the periphery, with connectors 358 operatively attached in between one or more of the adjacent feet. In this example, the connectors 358 are operatively attached (by any known means such as welding, fasteners or any other) between all of the adjacent feet thereby making the periphery of the wheel system 350 completely interconnected. The wheel system 350 example shown in FIG. 15 has a hub 349 and a framework 351 supporting all the feet 352, 353, 354, 355, 356 & 357 around the periphery. The framework 351 is operatively connected to the hub 349 at a radially inward side and operatively connected to the plurality of feet at radially outward side of the framework 351.

It will be noted that any one of a number of different types and configurations of a framework may be utilized between the central hub 349 and the periphery consisting of a plurality of feet 352, 353, 354, 355, 356 & 357, and connectors 358, with no one in particular being required to practice this invention. Some examples of this are illustrated in other figures herein, but others may be used.

Figure 16:
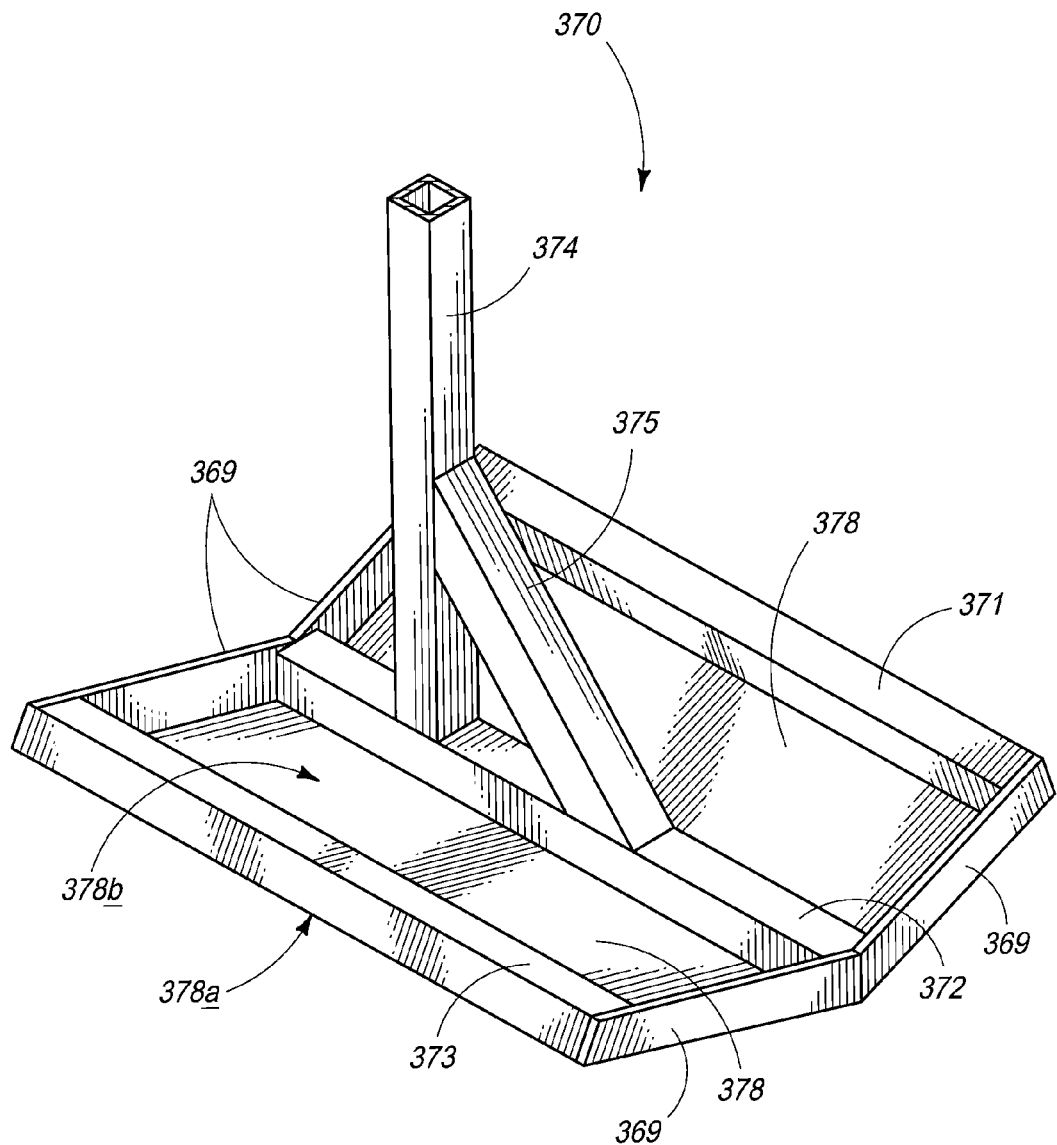
FIG. 16 is a perspective view of one example of one foot which may be utilized in practicing the example of the embodiment shown in FIG. 15.

FIG. 16 is a perspective view of one example of one foot 370 and part of a framework 374, 375, which may be utilized in practicing the example of the embodiment shown in FIG. 15. FIG. 16 illustrates spoke component 374 and spoke cross-support 375, foot frame consisting of foot frame members 371, 372 and 373, operatively interconnected by frame cross-members 369. Skin 378 may be operatively attached to the frame members and/or frame cross-members 369 in any one of a number of ways with no one in particular being required to practice this invention (fasteners, welding, etc.). The skin 378 has skin 378 outer surface 378a and skin 378 inner surface 378b.

In the example shown in FIG. 16, the frame members for the foot are operatively attached to the central frame member 372 at an approximate angle of fifteen (15) degrees and the skin 378 attached accordingly. As can be seen by a review of the plurality of feet 352, 353, 354, 355, 356 & 357, and connectors 358, in FIG. 15, the angling combined with the connectors gives a generally circular configuration of the wheel system 350 and the connectors tend to cause the overall wheel to operate in a unitary way which provides some additional strength to each of the individual feet.

Figure 17:
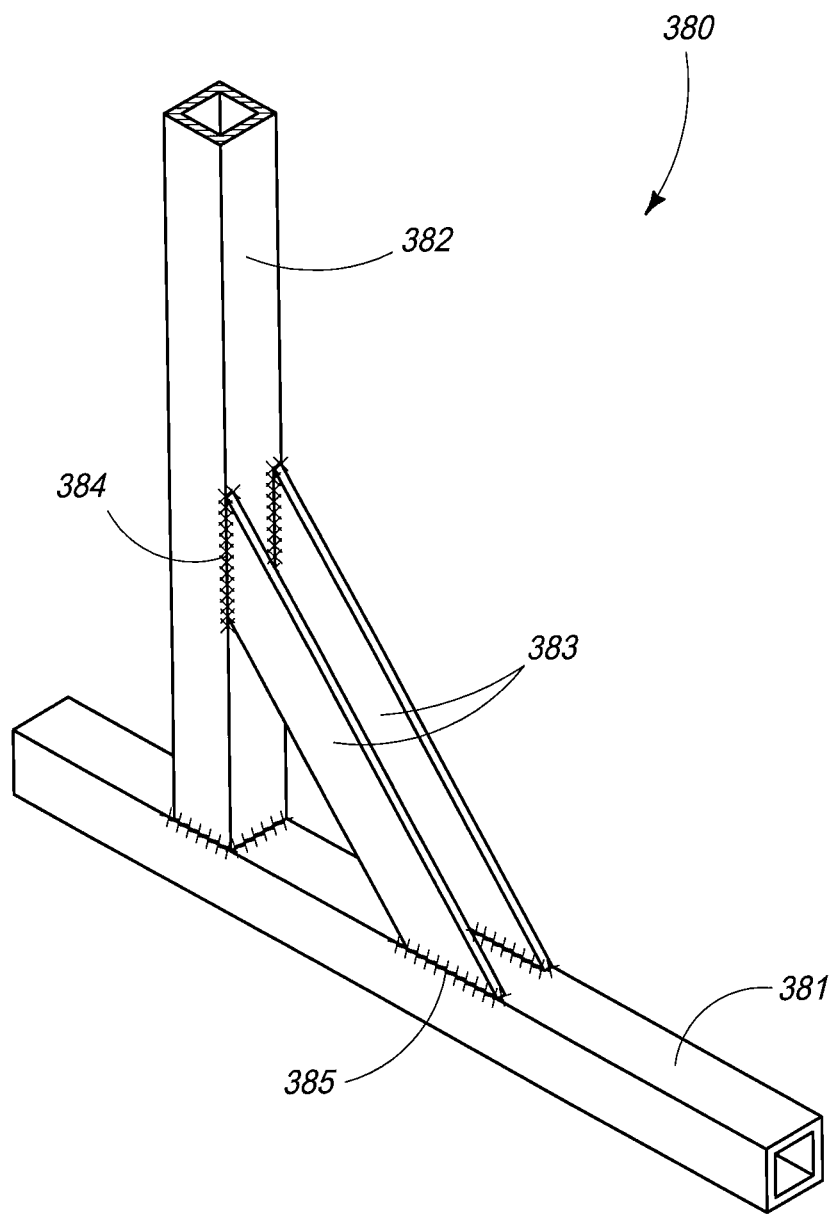
FIG. 17 is a perspective view of one example of part of the framework that may be utilized in supporting the foot shown in FIG. 16.

FIG. 17 is a perspective view of one example of a portion 380 of the overall framework that may be utilized in supporting the foot shown in FIG. 16. In FIG. 17, the cross-support 383 is comprised of two plates instead of a tubular member, with the respective ends of the plates 383 connecting the spoke member 382 to the foot member 381 by exemplary welds 384 and 385.

It should also be noted that in examples of embodiments of this invention there are no moving parts required, which tends to provide fewer opportunities for failure or required maintenance.

As will be appreciated by those of reasonable skill in the art, there are numerous embodiments to this invention, and variations of elements, components and combinations, which may be used, all within the scope of this invention.

One embodiment of this invention, for example, is a wheel system for use supporting and moving irrigation equipment comprising: a hub; a framework operatively attached relative to the hub on a radially inward end, and operatively attached to and supporting a plurality of feet on a radially outward end; a plurality of gaps between the plurality of feet; and the plurality of feet and the plurality of gaps being configured such that mud and water beneath the plurality of feet are primarily directed via the plurality of gaps to remain within a width of the feet.

Further embodiments from that recited in the preceding paragraph may include wheel system which: further comprise a plurality of connectors operatively attached to and between adjacent of the plurality of feet; further wherein each of the plurality of feet are in the range of twenty-two to thirty inches wide and sixteen to twenty-four inches long; further wherein each of the plurality of feet includes a leading edge configured to provide traction as the wheel system rotates; further comprising a plurality of connectors operatively attached to and between each of adjacent feet of the plurality of feet; further wherein each of the plurality of feet is comprised of at least three structural support members with connectors members attached between the at least three structural support members, and further including a skin attached to the at least three structural support members on a radially outward side; and/or further wherein the plurality of gaps are in the range of four to six inches long.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A wheel system for use supporting and moving irrigation equipment comprising:
   a hub;
   a framework operatively attached relative to the hub on a radially inward end, and operatively attached to and supporting a plurality of feet on a radially outward end, each of the plurality of feet comprising:
   a radially outward surface;
   a leading end and a trailing end;
   a first side surface and a second side surface;
   a gap between the leading end and trailing end of each of the plurality of feet;
   a continuous structural periphery at and interconnecting the first side surface of each of the plurality of feet;
   a continuous structural periphery at and interconnecting the second side surface of each of the plurality of feet; and
   the plurality of feet and the plurality of gaps being configured such that mud and water beneath the plurality of feet and falling within the plurality of gaps is primarily directed into the plurality of gaps and between the continuous structural periphery at and interconnecting the first side surfaces of each of the plurality of feet the continuous structural periphery at and interconnecting the second side surfaces of each of the plurality of feet.

2. A wheel system for use supporting and moving irrigation equipment as recited in claim 1, and further comprising a plurality of connectors operatively attached to and between adjacent of the plurality of feet.

3. A wheel system for use supporting and moving irrigation equipment as recited in claim 1, and further wherein each of the plurality of feet are in the range of twenty-two to thirty inches wide and sixteen to twenty-four inches long.

4. A wheel system for use supporting and moving irrigation equipment as recited in claim 1, and further wherein each of the plurality of feet includes a leading edge configured to provide traction as the wheel system rotates.

5. A wheel system for use supporting and moving irrigation equipment as recited in claim 1, and further comprising a plurality of connectors operatively attached to and between each of adjacent feet of the plurality of feet.

6. A wheel system for use supporting and moving irrigation equipment as recited in claim 1, and further wherein each of the plurality of feet is comprised of at least three structural support members with connector members attached between the at least three structural support members, and further including a skin attached to the at least three structural support members on a radially outward side.

7. A wheel system for use supporting and moving irrigation equipment as recited in claim 1, and further wherein the plurality of gaps are in the range of four to six inches long.

\* \* \* \* \*